US008873868B2

(12) United States Patent
Nakano et al.

(10) Patent No.: US 8,873,868 B2
(45) Date of Patent: Oct. 28, 2014

(54) OBJECT CLASSIFICATION/RECOGNITION APPARATUS AND METHOD

(71) Applicants: Honda Motor Co., Ltd., Tokyo (JP); National University Corporation Kobe University, Kobe-shi, Hyogo (JP)

(72) Inventors: Mikio Nakano, Wako (JP); Naoto Iwahashi, Wako (JP); Yasuo Ariki, Kobe (JP); Yuko Ozasa, Kobe (JP); Takahiro Hori, Kobe (JP); Ryohei Nakatani, Kobe (JP)

(73) Assignees: Honda Motor Co. Ltd., Tokyo (JP); National University Corporation Kobe University, Kobe-shi, Hyogo (JP)

( * ) Notice: Subject to any disclaimer, the term of this patent is extended or adjusted under 35 U.S.C. 154(b) by 77 days.

(21) Appl. No.: 13/724,220

(22) Filed: Dec. 21, 2012

(65) Prior Publication Data

US 2013/0163887 A1    Jun. 27, 2013

(30) Foreign Application Priority Data

Dec. 22, 2011 (JP) ................................. 2011-282103

(51) Int. Cl.
*G06K 9/62* (2006.01)
*G10L 15/02* (2006.01)

(52) U.S. Cl.
CPC .................................... *G06K 9/6267* (2013.01)
USPC ............................ 382/228; 704/240; 704/251

(58) Field of Classification Search
None
See application file for complete search history.

(56) References Cited

U.S. PATENT DOCUMENTS

| 2005/0043956 | A1* | 2/2005 | Aoyama et al. | 704/276 |
| 2005/0147302 | A1* | 7/2005 | Leung | 382/190 |
| 2009/0110284 | A1* | 4/2009 | Lamprecht et al. | 382/187 |
| 2011/0109539 | A1* | 5/2011 | Wu et al. | 345/156 |
| 2011/0112839 | A1* | 5/2011 | Funakoshi et al. | 704/249 |

FOREIGN PATENT DOCUMENTS

JP    2010-282199 A    12/2010

OTHER PUBLICATIONS

McGuire et al. "Multi-Modal Human-Machine Communication for Instructing Robot Grasping Tasks." IEEE/RSJ International Conference on Intelligent Robots and Systems, vol. 2, 2002, pp. 1082-1088.*
Gnjatovic et al. "Adaptive Multimodal Interaction with Industrial Robot." IEEE 10th Jubilee International Symposium on Intelligent Systems and Informatics, Sep. 20, 2012, pp. 329-333.*

(Continued)

*Primary Examiner* — Jon Chang
(74) *Attorney, Agent, or Firm* — Squire Patton Boggs (US) LLP

(57) ABSTRACT

An apparatus is provided for classifying targets into a known-object group and an unknown-object group. The apparatus includes a speech/image data storage unit configured to store a spoken sound of a name of an object and an image of the object; a unit configured to calculate a speech confidence level of a speech for the name of the object with reference to a spoken sound of a name of a known object; a unit configured to calculate an image confidence level of an image of an object with respect to an image of a known object; and a unit configured to compare an evaluation value, which is obtained by combining the speech confidence level and image confidence level, with a threshold value, and classify a target object into an object group determined according to whether the spoken sound of the name and the image are known or unknown.

7 Claims, 10 Drawing Sheets

(56) References Cited

OTHER PUBLICATIONS

Zuo et al. "Robot-Directed Speech Detection Using Multimodal Semantic Confidence Based on Speech, Image, and Motion." IEEE International Conference on Acoustics Speech and Signal Processing, Mar. 14, 2010, pp. 2458-2461.*

T. Araki, et al, "Autonomous Acquisition of Multimodal Information for Online Object Concept Formation by Robots", IEEE International Conference on Intelligent Robots and Systems, Sep. 25-30, 2011, pp. 1540-1547.

Takio Kurita, "Iterative Weighted Least Squares Algorithms for Neural Networks Classifiers," New Generation Computing, vol. 12, Mar. 1, 1994, pp. 375-394.

* cited by examiner (a)

BALL (KNOWN)

(b)

BOOK (UNKNOWN)

(a)

(b)

OBJECT CLASSIFICATION/RECOGNITION APPARATUS AND METHOD

TECHNICAL FIELD

The present invention relates to an apparatus and a method for classifying objects between a known-object group and an unknown-object group, and an object recognition apparatus and an object recognition method using the same.

BACKGROUND ART

There has been developed a robot which operates communicating with humans. Such a robot is required to have a function of recognizing surrounding objects. If information such as an object image is provided to a robot in advance, an object can be recognized with a predetermined degree of accuracy from visual information. However, it is not practical to provide the robot in advance with information of all objects that may lie around the robot. Therefore, there is a need that the robot has a function of identifying an unknown object, as well as a function of recognizing a known object. Such capability makes it possible for the robot to cope with the unknown object by identifying the unknown object.

FIG. 1 is a diagram illustrating a robot and surrounding objects. The robot has data for the objects other than a vase and can recognize the objects. The robot has no data about the vase. In this case, if the robot can identify the vase as an unknown object, the robot can communicate with humans, based on the identification. For example, when a human orders the robot to "Please bring the vase.", the robot may identify the vase as an unknown object and then ask the human "Is this the vase?" pointing to the vase, an unknown object.

Conventionally, a method for forming a concept of an object using multimodal information of an auditory sense, a visual sense, and a tactile sense (Non-Patent Literature 1) and a lexical acquisition apparatus for storing an unknown name during conversation (Patent Literature 1) have been developed. However, no apparatus and method for identifying an unknown object has been developed.

PRIOR ART LIST

Patent Literature

Patent Literature 1: JP 2010-282199 A

Non Patent Literature

Non Patent Literature 1: T. Araki, T. Nakamura, T. Nagai, K. Funakoshi, M. Nakano, N. Iwahashi, "Autonomous Acquisition of Multimodal Information for Online Object Concept Formation by Robots", IEEE International Conference on Intelligent Robots and Systems, 2011.

SUMMARY OF INVENTION

Technical Problem

Therefore, there is a need for an apparatus and a method for classifying objects between a known-object group and an unknown-object group, and for an object recognition apparatus and an object recognition method using the same.

Solution to Problem

An object classification apparatus according to a first aspect of the present invention includes: a speech/image data storage unit configured to store a spoken sound of a name of an object and an image of the object; a speech confidence level calculation unit configured to calculate a speech confidence level of a speech for the name of the object with reference to a speech model of a name of a known object, the speech confidence level being a ratio of speech likelihood of the name of the object for the speech model of the name of the known object to the highest speech likelihood among speech likelihoods calculated in phoneme sequence for the spoken sound of the name of the object; an image confidence level calculation unit configured to calculate an image confidence level of an image of an object with reference to an image model of a known object, the image confidence level being defined as a ratio of image likelihood of the object for the image model of the known object to the highest image likelihood among image likelihoods the image model of the known object may take; and an object classification unit configured to compare an evaluation value, which is obtained by combining the speech confidence level and image confidence level, with a threshold value and classify a target object into an object group determined according to whether the spoken sound of the name and the image are known or unknown.

Since the object classification apparatus of the present aspect performs the classification by comparing the evaluation value that is a combination of a speech confidence level and the image confidence level with a threshold value, the target object may be classified with high accuracy into an object group determined according to whether spoken sound of a name and an image of the object are known or unknown.

In an object classification apparatus according to a first embodiment of the first aspect of the present invention, the object classification unit is configured to classify objects into a group of objects whose spoken sound of name and image are known, and a group of objects whose spoken sound of name and image are unknown.

According to the object classification apparatus of the present embodiment, when the target object is one, the object classification apparatus can classify the target object, with high accuracy, between an object whose spoken sound of name and image are known and an object whose spoken sound of name and image are unknown.

In an object classification apparatus according to a second embodiment of the first aspect of the present invention, the object classification unit is configured to classify objects into a group of objects whose spoken sound of name and image are known, and a group of objects whose at least one of spoken sound of name and image are unknown.

According to the object classification apparatus of the present embodiment, when the target object is a plurality of objects including a known object and an unknown object, an object whose spoken sound of name and image are known can be classified with high accuracy.

In an object classification apparatus according to a third embodiment of the first aspect of the present invention, the object classification unit is configured to classify objects into a group of objects whose spoken sound of name and image are known, a group of objects whose only one of spoken sound of name and image is unknown, and a group of objects whose spoken sound of name and image are unknown.

According to the object classification apparatus of the present embodiment, when the target object is a plurality of objects including a known object and an unknown object, an object whose spoken sound of name and image are known and an object whose spoken sound of name and image are unknown can be classified with high accuracy.

An object recognition apparatus according to a second aspect of the present invention includes: an object classification apparatus; and an object recognition unit configured to recognize which known object a target object is, the target object being classified into a group of objects whose spoken sound of name and image are known.

The object recognition apparatus of the present aspect can recognize the target object, classified into a group of objects whose spoken sound of name and image are known, with high accuracy.

An object classification method according to a third aspect of the present invention is an object classification method using a classification apparatus including a data storage unit configured to store a spoken sound of a name of an object and an image of the object. The object classification method of the present aspect includes: calculating a speech confidence level of a speech related to the name of the object with reference to a speech model of a name of a known object, the speech confidence level being a ratio of speech likelihood of the name of the object for the speech model of the name of the known object to the highest speech likelihood among speech likelihoods calculated in phoneme sequence for the spoken sound of the name of the object; calculating an image confidence level of an image of an object with reference to an image model of a known object, the image confidence level being a ratio of image likelihood of the object for the image model of the known object to a highest image likelihood among image likelihoods the image model of the known object may take; and calculating an evaluation value by combining the speech confidence level and the image confidence level, comparing the evaluation value with a threshold value, and classifying a target object into an object group determined according to whether the spoken sound of the name and the image are known or unknown.

According to the object classification method of the present aspect, since the classification is performed by comparing the evaluation value, which is obtained by combining the speech confidence level and the image confidence level, with the threshold value, the target object can be classified, with high accuracy, into the object group determined according to whether the spoken sound of the name and the image are known or unknown.

An object recognition method according to a fourth aspect of the present invention is an object recognition method using a classification apparatus including a data storage unit configured to store a spoken sound of a name of an object and an image of the object. The object recognition method of the present aspect includes: calculating a speech confidence level of a speech for the name of the object relative to a speech model of a name of a known object, the speech confidence level being the ratio of speech likelihood of the name of the object for the speech model of the name of the known object to the highest speech likelihood among speech likelihoods calculated in phoneme sequence for the spoken sound of the name of the object; calculating an image confidence level of an image of an object relative to an image model of a known object, the image confidence level being the ratio of image likelihood of the object for the image model of the known object to the highest image likelihood among image likelihoods the image model of the known object can take; calculating an evaluation value by combining the speech confidence level and the image confidence level, comparing the evaluation value with a threshold value, and classifying a target object into an object group determined according to whether the spoken sound of the name and the image are known or unknown; and recognizing which known object the target object is, the target object being classified into a group of objects whose spoken sound of name and image are known.

According to the object recognition method of the present aspect, the target object classified into a group of objects whose spoken sound of name and image are known can be recognized with high accuracy.

DESCRIPTION OF EMBODIMENTS

Figure 1:
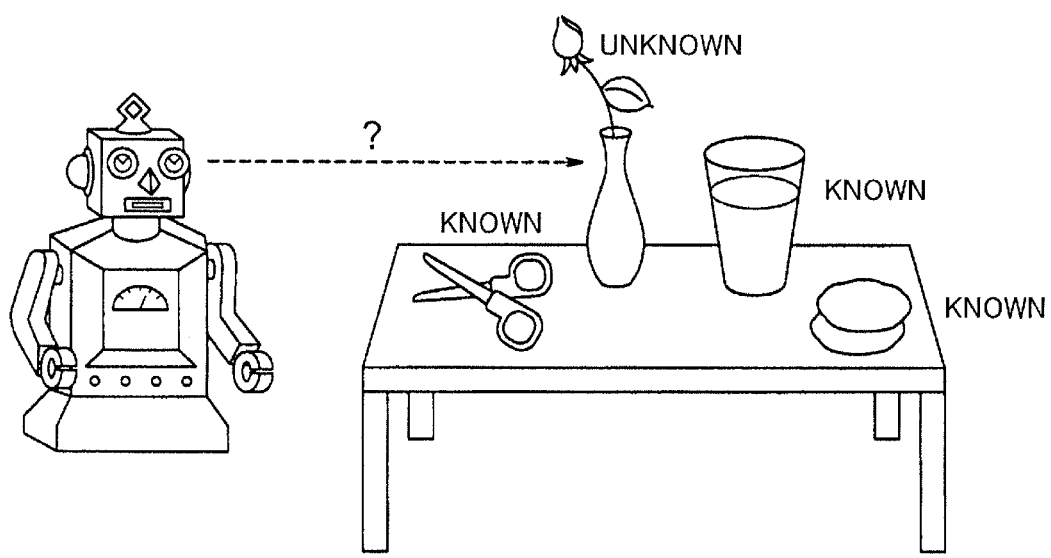
FIG. 1 is a diagram illustrating a robot and surrounding objects.
Figure 2:
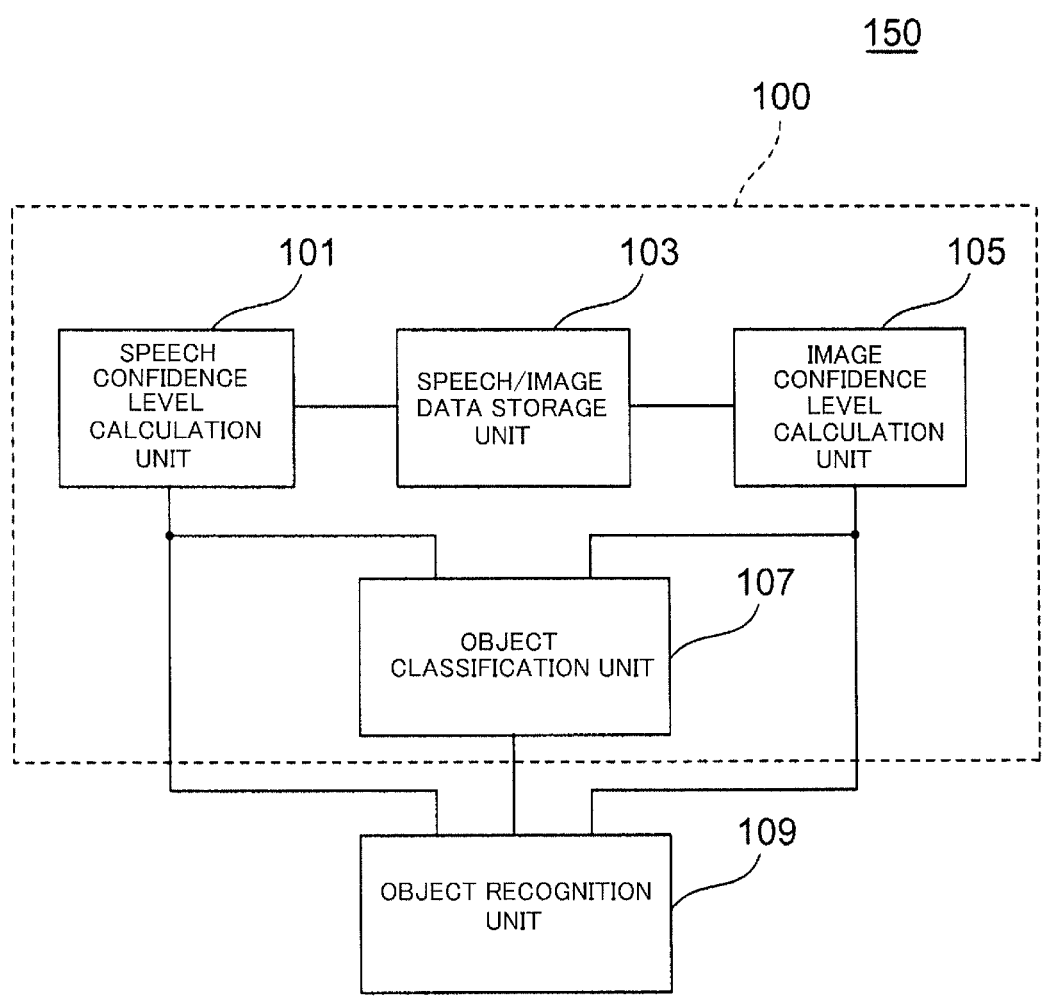
FIG. 2 is a diagram illustrating a configuration of an object classification apparatus 100 and an object recognition apparatus 110 according to an embodiment of the present invention.

FIG. 2 is a diagram illustrating a configuration of an object classification apparatus 100 and an object recognition apparatus 150 according to an embodiment of the present invention.

The object classification apparatus 100 includes a speech confidence level calculation unit 101, a speech/image data storage unit 103, an image confidence level calculation unit 105, and an object classification unit 107. The speech/image data storage unit 103 stores spoken sounds of names of known objects and images of the known objects. The speech confidence level calculation unit 101 calculates a speech confidence level of the speech of the name of a captured object with reference to a spoken sound of a name of a certain known object. The speech confidence level will be described below. The image confidence level calculation unit 105 calculates an image confidence level of a captured image of an object with reference to an image of a certain known object. The image confidence level will be described below. The object classification unit 107 calculates an evaluation value by combining the speech confidence level obtained by the speech confidence level calculation unit 101 and the image confidence level obtained by the image confidence level calculation unit 105, and compares the evaluation value with a threshold value to classify a target object into a group of objects, which is determined according to whether a spoken sound of a name and an image are known or unknown. Details of the functions of the speech confidence level calculation unit 101, the image confidence level calculation unit 105, and the object classification unit 107 will be described below.

The object recognition apparatus 150 includes the above-described object classification apparatus 100 and an object recognition unit 109. The object recognition unit 109 recognizes which known object a target object is, wherein the target object is classified by the object classification apparatus 100 into the group of objects, of which the spoken sound of the name and the image are known.

Figure 3:
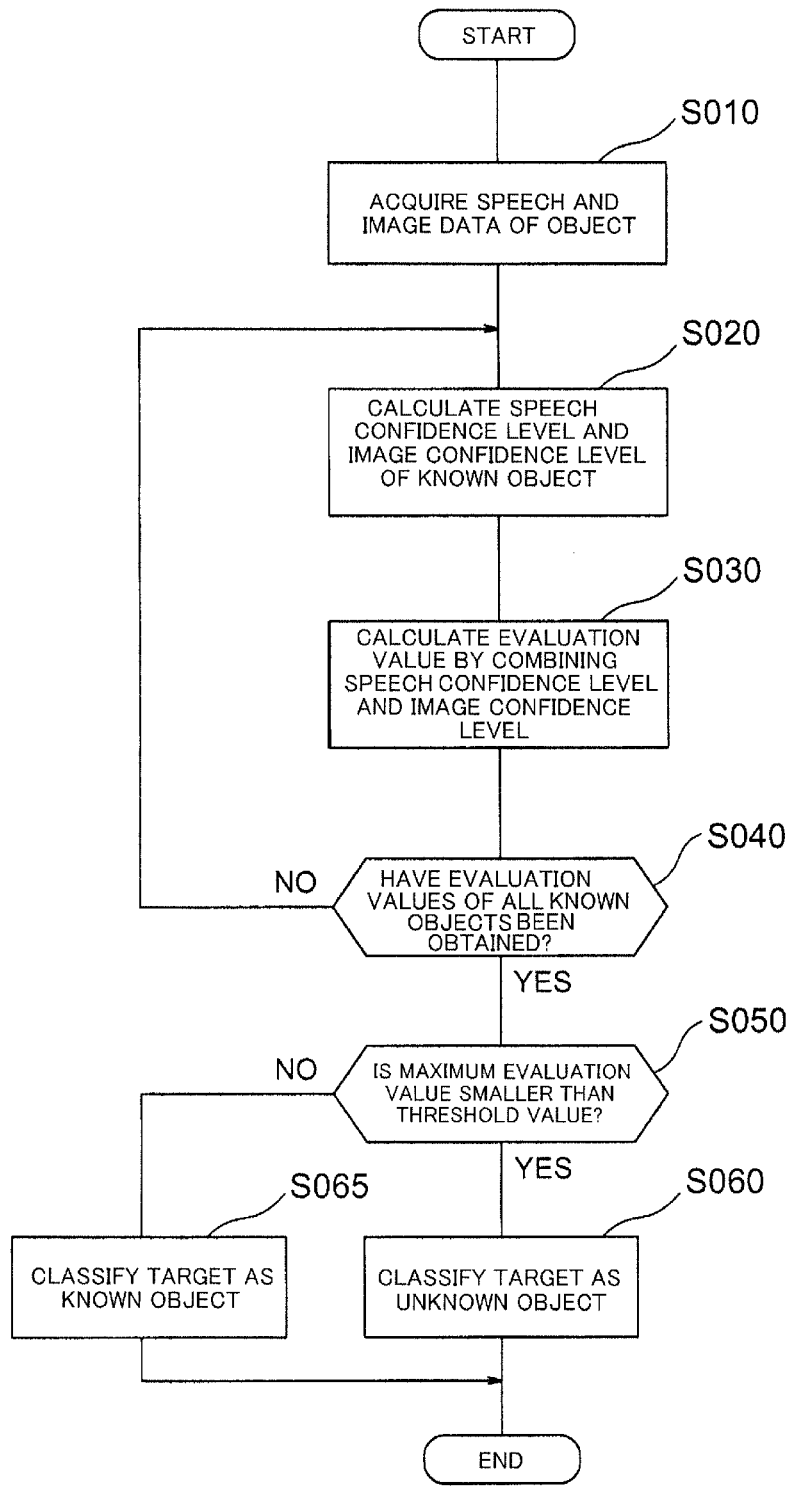
FIG. 3 is a flow chart describing an object classification method using the object classification apparatus.

FIG. 3 is a flow chart describing an object classification method using the object classification apparatus 100.

In step S010 of FIG. 3, the object classification apparatus 100 acquires speech and image data. The speech data is sent to the speech confidence level calculation unit 101, and the image data is sent to the image confidence level calculation unit 105.

In step S020 of FIG. 3, the speech confidence level calculation unit 101 calculates a speech confidence level of the speech for the name of the captured object relative to a speech model of a name of a known object. More specifically, speech likelihood of a word HMM (Hidden Markov Model) is calculated using the following formulas by Julius.

$$P_s(s; \Lambda_i) = \log P(s; \Lambda_i)$$ [Mathematical Formula 1]

Here, $$P_s(s; \Lambda_i)$$ [Mathematical Formula 2]

is likelihood of the speech. Further, s represents the speech related to the name of the captured object, and $$\Lambda_i$$ [Mathematical Formula 3]

represents a word HMM of an i-th object. The speech confidence level of the speech for the name of the object relative to the speech model of the name of the i-th object is a ratio of the speech likelihood to the speech model for the name of the i-th object for the highest likelihood among the speech likelihoods calculated in phonemic sequence for the spoken sound of the name of the object. The speech confidence level is calculated by the following formula.

[Mathematical Formula 4]

$$C_s(s; \Lambda_i) = \frac{1}{n(s)} \log \frac{P(s; \Lambda_i)}{\max P(s; \Lambda_{ui})}$$

Here, n(s) represents the number of speech frames of input speech, and $$\mu_i$$ [Mathematical Formula 5]

represents the phoneme sequence of the i-th object.

In step S020 of FIG. 3, the image confidence level calculation unit 105 calculates an image confidence level of the image of the captured object with reference to the image model of the known object. More specifically, feature amounts used for image recognition are L*a*b color information (three-dimension), coefficient (eight-dimension) of Fourier series of an image contour, and an area (one-dimension) of an object. These feature amounts are learned by a normal distribution to which MAP (Maximum a posteriori, maximum a posteriori probability estimation) is adapted. The logarithm likelihood of the image is calculated as the following formula.

$$P_o(o; g_i) = \log P(o; g_i)$$ [Mathematical Formula 6]

Here, $$P(o; g_i)$$ [Mathematical Formula 7]

represents the logarithm likelihood of the image. Further, o represents the image of the captured object, and $$g_i$$ [Mathematical Formula 8]

represents a normal distribution of the i-th object. The image confidence level of the image of the object relative to the image model of the i-th object is the ratio of the image likelihood for the image model of the i-th object to the highest image likelihood among the image likelihoods the image model of the i-th object can take. The image confidence level is calculated by the following formula.

[Mathematical Formula 9]

$$C_o(o; g_i) = \log \frac{P(o; g_i)}{\max P(o; g_i)}$$

Here, $$\max P(o, g_i)$$ [Mathematical Formula 10]

represents a maximum value of the normal distribution.

In step S030 of FIG. 3, the object classification unit 107 calculates an evaluation value by combining the speech confidence level obtained by the speech confidence level calculation unit 101 and the image confidence level obtained by the image confidence level calculation unit 105. More specifically, the evaluation value is calculated as the following formula by logistic regression.

[Mathematical Formula 11]

$$F_c(C_s, C_o) = \frac{1}{1 + e^{-(\alpha_0 + \alpha_1 C_s + \alpha_2 C_o)}}$$

Here, $$\alpha_0, \alpha_1, \alpha_2$$ [Mathematical Formula 12]

is a coefficient of the logistic regression. A method for calculating $$\alpha_0, \alpha_1, \alpha_2$$ [Mathematical Formula 13]

by learning will be described below.

In step S040 of FIG. 3, the object classification unit 107 determines whether evaluation values of all known objects have been obtained. If the evaluation values of all known objects have been calculated, the process proceeds to step S050. If not, the process returns to step S020.

In step S050 of FIG. 3, the object classification unit 107 determines whether a maximum evaluation value is smaller than a threshold value δ, based on the following formula.

$$\max(F_c(C_s(s; \Lambda_i), C_o(o; g_i))) < \delta$$ [Mathematical Formula 14]

If Formula 14 is satisfied, the maximum evaluation value is smaller than the threshold value δ, and therefore, the process proceeds to step S060. If not, the maximum evaluation value is equal to or greater than the threshold value δ, and therefore, the process proceeds to step S065.

In step S060 of FIG. 3, the object classification unit 107 classifies the target as an unknown object.

In step S065 of FIG. 3, the object classification unit 107 classifies the target as a known object.

When the target is classified as the known object, the object is recognized and an object class number is obtained by the following formula.

$$\hat{I} = \mathrm{argmax}(F_c(C_s(s; \Lambda_i), C_o(o; g_i)))$$ [Mathematical Formula 15]

Next, a method for obtaining $$\alpha_0, \alpha_1, \alpha_2 \quad \text{[Mathematical Formula 16]}$$

by learning will be described. In the learning of the logistic function, an i-th learning sample is given by an input signal and an instruction signal $d_i$. Therefore, a learning data set T of N samples becomes as follows.

$$T^N = \{C_s(s; \Lambda_i), C_o(o; g_i), d_i | i=1, \ldots, N\} \quad \text{[Mathematical Formula 17]}$$

Here, $d_i$ is 0 or 1. $d_i=0$ represents an unknown object, and $d_i=1$ represents a known object.

Figure 4:
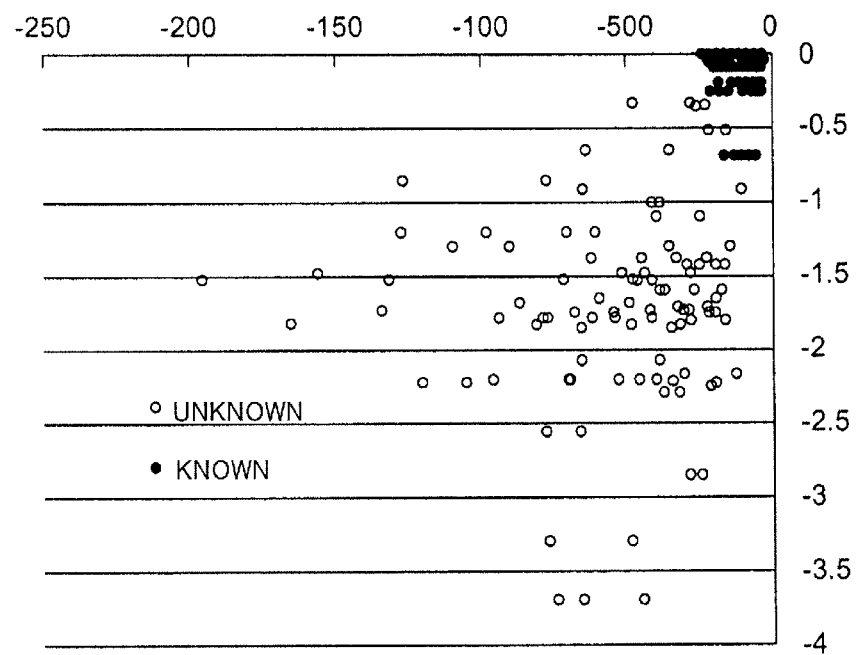
FIG. 4 is a diagram illustrating distributions of an image confidence level and a speech confidence level of a learning sample.

FIG. 4 is a diagram illustrating distributions of an image confidence level and a speech confidence level of a learning sample. In FIG. 4, a white circle represents an unknown-speech/unknown-image sample, and a black circle represents a known-speech/known-image sample.

A likelihood function is expressed as follows.

$$P(d|\alpha_0, \alpha_1, \alpha_2) = \pi_{i=1}^{N} (i \, F_C(C_g, C_0))^{d_i} (1-F_c(C_g, C_o))^{1-d_i} \quad \text{[Mathematical Formula 18]}$$

Here, $d=(d_1, \ldots, d_N)$. A weight expressed as $$\alpha_0, \alpha_1, \alpha_2 \quad \text{[Mathematical Formula 19]}$$

is estimated by a maximum likelihood estimation method using a Fisher algorithm (for example, T. Kurita, "Interactive Weighted Least Squares Algorithms for Neural Networks Classifiers, in Proc. Workshop on Algorithmic Learning Theory, 1992.).

In the first embodiment of the present invention, the learning data set T includes an unknown-speech/unknown-image set and a known-speech/known-image set.

Next, an evaluation experiment of the object classification method and the object recognition method of the present invention will be described. An unknown-object detection experiment for the object classification method and an object recognition experiment for the object recognition method were conducted. The weight expressed as $$\alpha_0, \alpha_1, \alpha_2 \quad \text{[Mathematical Formula 20]}$$

and the threshold value δ were optimized in the experiment.

In this experiment, fifty objects were prepared. In each object, one speech and ten images were prepared. All speeches were made by one speaker.

First, the unknown-object detection experiment will be described. The evaluation was conducted by a leave-one-out-cross-validation (LOOCV). (1) Whether the known object was correctly classified as the known object and (2) whether the unknown object was correctly classified as the unknown object were checked, and the accuracy was obtained.

Image data processing was performed as follows. In the above mentioned case (1), one image was selected from the fifty objects as test data, and the others were set as learning data. This experiment was conducted on the total five-hundred images. That is, the likelihood and confidence level of the image data were calculated, and unknown or known was determined with reference to a threshold value. Here, the accuracy is a ratio of successful trials of determination for unknown or known to five-hundred trials. The same is applied to the following. In the above mentioned case (2), one object was selected from each of the fifty objects, ten images were set as test data, and the remaining four-hundred-ninety images were set as learning data. This experiment was conducted on five-hundred images. That is, the likelihood and confidence level of the image data were calculated, and a determination as to whether to be unknown or known was made by a threshold value determination.

Speech data processing was performed as follows. In the above mentioned case (1), fifty-class speeches are registered in a dictionary in advance as known-speech test data, and the likelihood and confidence level are calculated. Then, a determination as to unknown or known is made with reference to a threshold value. Each of the fifty-class speeches was set as known-speech test data, and a determination was made. That is, the accuracy of the known speech being determined as known is calculated. In the above mentioned case (2), forty-nine classes in the fifty-class speeches are registered in a dictionary in advance, thus the remaining one class is an unknown-speech test data. The likelihood and confidence level are calculated. Then, a determination as to whether it is unknown or known is made with reference to a threshold value. Each of the fifty-class speeches is set as unknown-speech test data, and a determination is made. That is, the accuracy of unknown speech being determined as unknown is calculated.

In the method using Formula 11 according to the embodiment, the weight expressed as $$\{\alpha_0, \alpha_1, \alpha_2\} \quad \text{[Mathematical Formula 21]}$$

was $\{7.64, 5.22, 5.16 \times 10^{-3}\}$. In the method using the log likelihood instead of the confidence level in Formula 5, the weight was $\{9.17, 0.02, 0.15\}$. In all cross-validations (CVs), the accuracy in one threshold value was evaluated.

Figure 5:
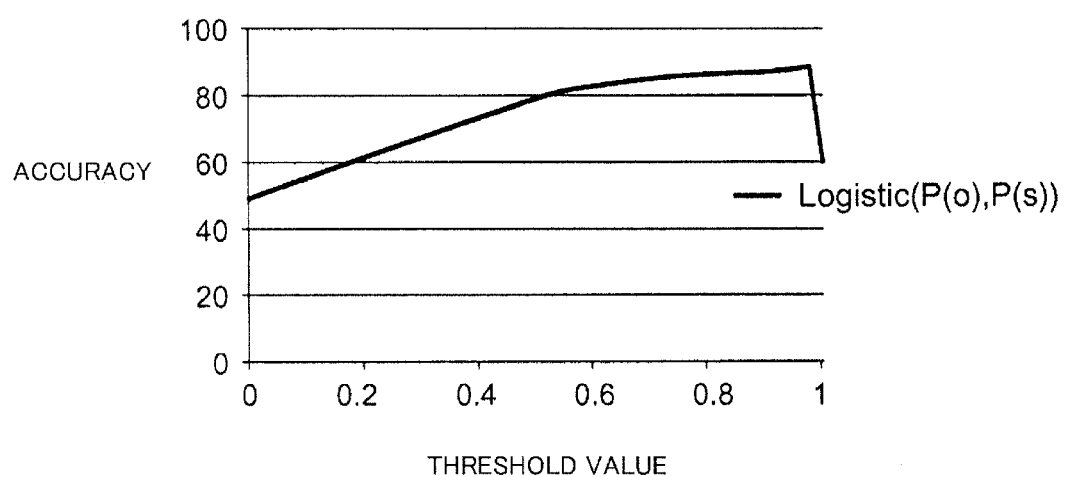
FIG. 5 is a diagram illustrating a variation in accuracy by a threshold value in a method using log likelihood instead of confidence level in Formula (5).

FIG. 5 is a diagram illustrating a variation in accuracy by the threshold value in the method using the log likelihood instead of the confidence level in Formula 11.

Figure 6:
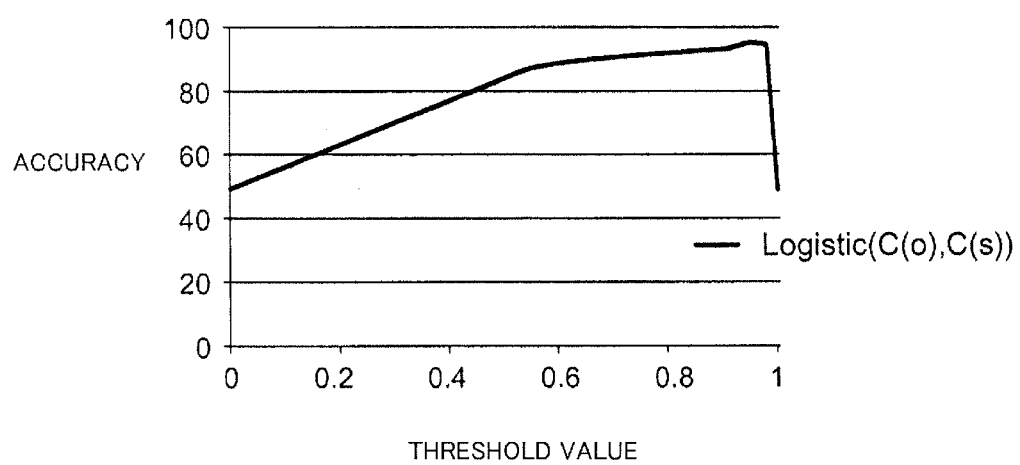
FIG. 6 is a diagram illustrating a variation in accuracy by a threshold value in a method using Formula (5) according to the present embodiment.

FIG. 6 is a diagram illustrating a variation in accuracy by the threshold value in the method using Formula 11 according to the present embodiment.

In FIGS. 5 and 6, a horizontal axis represents the threshold value, and a vertical axis represents the accuracy. The optimal threshold value δ was 0.96 in the method using Formula 11 according to the present embodiment, and was 0.98 in the method using the log likelihood instead of the confidence level in Formula 11.

Table 1 below shows experimental results using the optimal weight.

TABLE 1

| Likelihood | | P(o) + P(s) | Logistic(P(o), P(s)) |
|---|---|---|---|
| Object P(o) | 93.20% | 78.70% | 89.40% |
| Speech P(s) | 66.00% | | |

| Confidence | | C(o) + C(s) | Logistic(C(o), C(s)) |
|---|---|---|---|
| Object C(o) | 93.20% | 94.60% | 97.00% |
| Speech C(s) | 95.00% | | |

In Table 1 above, "Likelihood" represents the likelihood, and "Confidence" represents the confidence level. P(o), P(s), C(o) and C(s) represent Formulas 6, 1, 9 and 4, respectively. Logistic (C(o), C(s)) represents Formula 11, and Logistic (P(o), P(s)) represents formula using the log likelihood (Formulas 1) and (6) instead of the confidence level (Formulas 4 and 9 in Formula 11).

Further, P(o)+P(s) represents formula below.

$$\log P(s; \Lambda_i) + \log P(o; g_i) \quad \text{[Mathematical Formula 22]}$$

C(o)+C(s) represents formula below.

[Mathematical Formula 23]

$$\frac{1}{n(s)} \log \frac{P(s; \Lambda_i)}{\max P(s; \Lambda_{ui})} + \log \frac{P(o; g_i)}{\max P(o; g_i)}$$

The accuracy by Logistic(C(o), C(s)) is 97.00%, and the accuracy by Logistic(P(o), P(s)) is 89.40%. Therefore, the accuracy in the case of using Formula 11 is improved by 7.6% as compared with the accuracy in the case of using the log likelihood instead of the confidence level in Formula 11. Further, in Table 1 above, the accuracy by Logistic(C(o), C(s)) is highest.

Next, the object recognition experiment will be described. The evaluation was conducted by a leave-one-out-cross-validation (LOOCV). With respect to image data, one image was selected from each of the fifty objects. The selected image was set as test data, and the others were set as learning data. This experiment was conducted on the five-hundred images. With respect to speech data, fifty-class speeches were previously registered in a dictionary. The fifty-class speeches were set as known-speech test data, and the likelihood and confidence level were calculated. Then, the fifty classes were classified. The same weight as in the unknown-object detection experiment was used.

Table 2 below shows experimental results. Both the accuracy by Logistic(C(o), C(s)) and the accuracy by Logistic(P(o), P(s)) are 100%.

TABLE 2

| | Likelihood | P(o) + P(s) | Logistic(P(o), P(s)) |
|---|---|---|---|
| Object P(o) | 98.80% | 99.40% | 100.00% |
| Speech P(s) | 96.00% | | |
| | Confidence | C(o) + C(s) | Logistic(C(o), C(s)) |
| Object C(o) | 98.80% | 99.40% | 100.00% |
| Speech C(s) | 96.00% | | |

As described above, in the first embodiment of the present invention, the learning of $$\alpha_0, \alpha_1, \alpha_2 \quad \text{[Mathematical Formula 24]}$$

of Formula 11 was conducted by using a learning data set including an unknown-speech/unknown-image set and a known-speech/known-image set.

Figure 7:
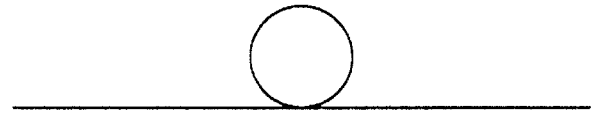
FIGS. 7($a$) and 7($b$) are diagrams illustrating a case where one object is placed on a desk.
Figure 7:
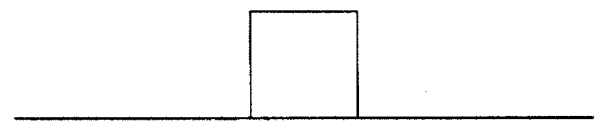

FIGS. 7(a) and 7(b) are diagrams illustrating a case where one object is placed on a desk. It is assumed that the object classification apparatus 100 according to the first embodiment stores speech data and image data of a "ball", but does not store data of a "book". In the case where a human orders to "take the ball on the desk", if one object placed on the desk is a "ball" as illustrated in FIG. 7(a), the object classification apparatus 100 according to the first embodiment can classify the "ball" as the known-speech/known-image object, and if one object placed on the desk is a "book" as illustrated in FIG. 7(b), the object classification apparatus 100 can classify the "book" as the unknown-speech/unknown-image object.

Figure 8:
FIGS. 8($a$) and ($b$) are diagrams illustrating a case where two objects are placed on a desk and a case where three objects are placed on a desk.
Figure 8:
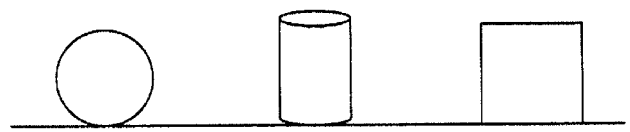

FIGS. 8(a) and 8(b) are diagrams illustrating a case where two objects are placed on a desk and a case where three objects are placed on a desk. It is assumed that the object classification apparatus 100 according to the first embodiment stores speech data and image data of a "ball" and a "cup", but does not store data of a "book". In the case where a human orders to "take the ball on the desk", since the object classification apparatus 100 according to the first embodiment has not learnt known-speech/unknown-image data and unknown-speech/known-image data, a determination may become unstable. Therefore, the object classification apparatus 100 may not determine the "ball" as the known-speech/known-image object.

Therefore, the object classification apparatus 100 according to the second embodiment sets a known-speech/known-image data set as $d_i=1$ and an unknown-speech/unknown-image, unknown-speech/known-image, and known-speech/ unknown image data set as $d_i=0$ in the learning data set of Formula 17, and carries out the learning of formula below.

$$\alpha_0, \alpha_1, \alpha_2 \quad \text{[Mathematical Formula 25]}$$

The object classification apparatus 100 having carried out the learning, according to the second embodiment, can identify a known-speech/known-image object even when a plurality of objects including an unknown object is placed on the desk.

However, even though the learning has been carried out as described above, in the state illustrated in FIGS. 8(a) and 8(b), in the case where a human orders to "take the book (unknown object) on the desk", the object classification apparatus 100 according to the second embodiment has not learnt the unknown-speech/unknown-image data, and therefore, the object classification apparatus 100 cannot narrow down the target.

Therefore, in an object classification apparatus 100 according to a third embodiment, first and second detectors are provided in the object classification unit 107. The first detector causes the object classification apparatus 100 to learn by the learning data set in which the known-speech/known-image data set is set as $d_i=1$, and the unknown-speech/unknown-image, unknown-speech/known-image, and known-speech/ unknown-image data set is set as $d_i=0$. The second detector causes the object classification apparatus 100 to learn by the learning data set in which the unknown-speech/unknown-image data set is set as $d_i=1$, and the known-speech/known image, unknown-speech/known-image, and known-speech/ unknown-image data set is set as $d_i=0$. The object classification apparatus 100 according to the third embodiment can perform the classification by the first and second detectors to classify objects into a known-speech/known image group, an unknown-speech/known-image and known-speech/unknown-image group, and an unknown-speech/unknown-image group.

Figure 9:
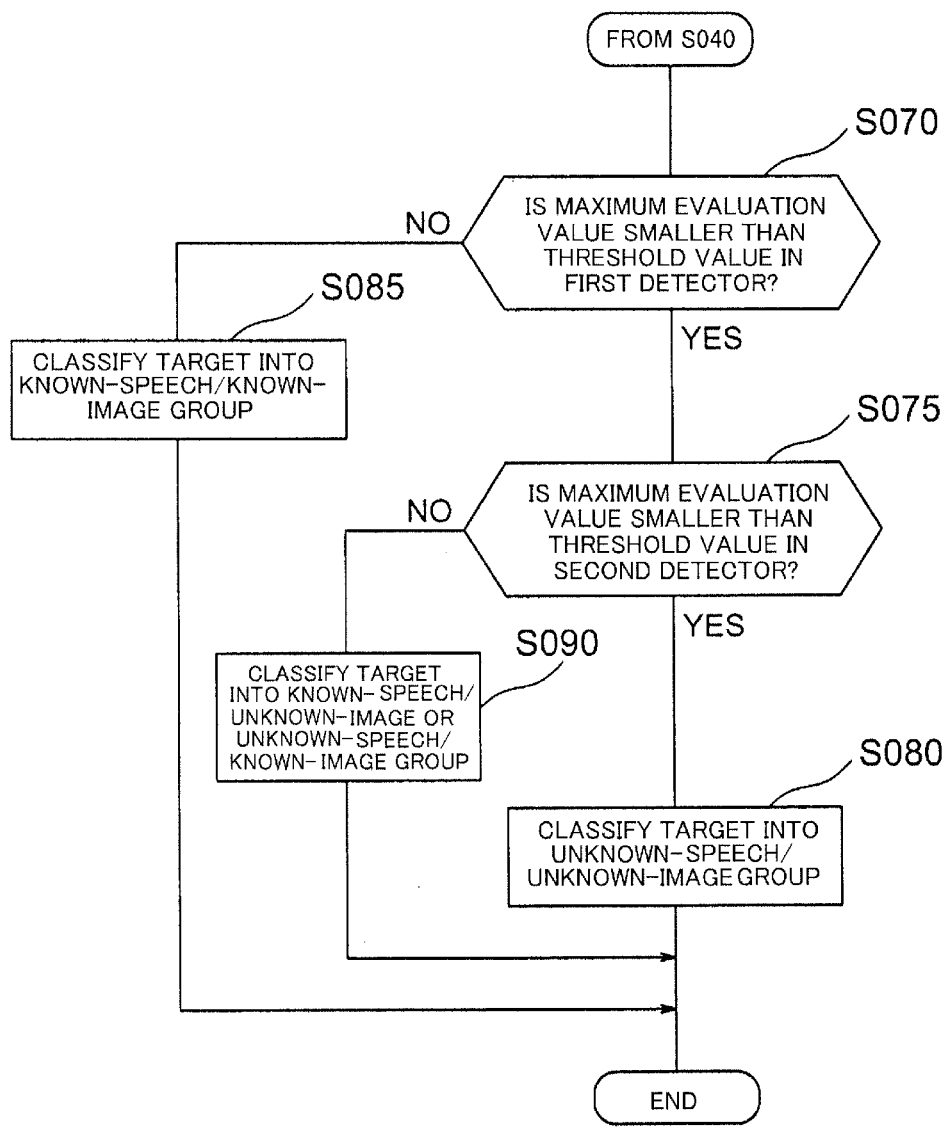
FIG. 9 is a flow chart describing an operation of first and second detectors of an object classification unit in an object classification apparatus according to a third embodiment.

FIG. 9 is a flow chart describing the operation of the first and second detectors of the object classification unit 107 in the object classification apparatus 100 according to the third embodiment. The branch of YES of step S040 in the flow chart of FIG. 3 is connected to step S070 of FIG. 9.

In step S070 of FIG. 9, the first detector determines whether the maximum evaluation value is smaller than the threshold value. If smaller, the process proceeds to step S075. If not, the process proceeds to step S085.

In step S085 of FIG. 9, the target is classified into the known-speech/known-image group.

In step S075 of FIG. 9, the second detector determines whether the maximum evaluation value is smaller than the threshold value. If smaller, the process proceeds to step S080. If not, the process proceeds to step S090.

In step S090 of FIG. 9, the target is classified into the known-speech/unknown-image or unknown-speech/known-image group.

In step S080 of FIG. 9, the target is classified into the unknown-speech/unknown-image group.

In the state illustrated in FIGS. 8(a) and 8(b), when a human orders to "take the book (unknown object) on the desk", the object classification apparatus 100 including the object classification unit 107 provided with the first and second detectors, according to the third embodiment, can identify the unknown object.

Figure 10:
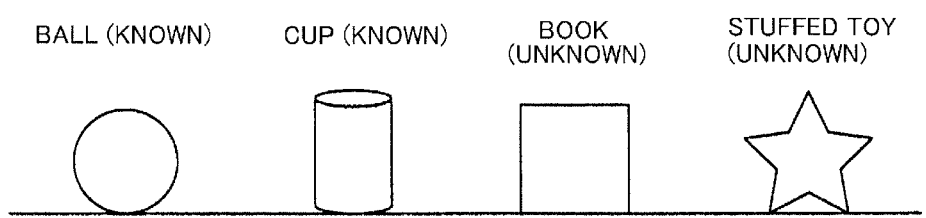
FIG. 10 is a diagram illustrating a case where four objects are placed on a desk.

FIG. 10 is a diagram illustrating a case where four objects are placed on a desk. It is assumed that the object classification apparatus 100 according to the third embodiment stores speech data and image data of a "ball" and a "cup", but does not store data of a "book" and a "stuffed toy". When a human orders to "take the book (unknown object) on the desk", the object classification apparatus 100 according to the third embodiment can classify the "book" and the "stuffed toy" into the unknown-speech/unknown-image group, and narrow down the target to these. The object classification apparatus 100 can ask a human, for example, "Which one is right?". Further, when a human orders to "take the can (known object) on the desk", the object classification apparatus 100 can determine that there is no known-speech image. Therefore, the object classification apparatus 100 can respond to the human by speaking, for example, "There is nothing you said."

REFERENCE SIGNS LIST

100 Object classification apparatus
101 Speech confidence level calculation unit
103 Speech/image data storage unit
105 Image confidence level calculation unit
107 Object classification unit
109 Object recognition unit

The invention claimed is:

1. An object classification apparatus comprising:
a speech/image data storage unit configured to store a spoken sound of a name of an object and an image of the object;
a speech confidence level calculation unit configured to calculate a speech confidence level of a speech for the name of the object with reference to a speech model of a name of a known object, the speech confidence level being a ratio of speech likelihood of the name of the object for the speech model of the name of the known object to the highest speech likelihood among speech likelihoods calculated in phoneme sequence for the spoken sound of the name of the object;
an image confidence level calculation unit configured to calculate an image confidence level of an image of an object with reference to an image model of a known object, the image confidence level being a ratio of image likelihood of the object for the image model of the known object to the highest image likelihood among image likelihoods that an image model of the known object may take; and
an object classification unit configured to compare an evaluation value, which is a combination of the speech confidence level and the image confidence level, with a threshold value, and to classify a target object into an object group determined according to whether the spoken sound of the name and the image are known or unknown.

2. The apparatus according to claim 1, wherein the object classification unit is configured to classify objects into a group of objects whose spoken sound of name and image are known, and a group of objects whose spoken sound of name and image are unknown.

3. The apparatus according to claim 1, wherein the object classification unit is configured to classify objects into a group of objects whose spoken sound of name and image are known, and a group of objects whose at least one of spoken sound of name and image is unknown.

4. The apparatus according to claim 1, wherein the object classification unit is configured to classify objects into a group of objects whose spoken sound of name and image are known, a group of objects whose only one of spoken sound of name and image is unknown, and a group of objects whose spoken sound of name and image are unknown.

5. An object recognition apparatus comprising:
the object classification apparatus of claim 1; and
an object recognition unit configured to recognize which known object a target object is, the target object being classified into a group of objects whose spoken sound of name and image are known.

6. An object classification method, wherein a classification apparatus including a data storage unit configured to store a spoken sound of a name of an object and an image of the object is used, the method comprising:
calculating a speech confidence level of a spoken sound for the name of the object with reference to a speech model of a name of a known object, the speech confidence level being a ratio of speech likelihood of the name of the object for the speech model of the name of the known object to the highest speech likelihood among speech likelihoods calculated in phoneme sequence for to the spoken sound of the name of the object;
calculating an image confidence level of an image of an object with reference to an image model of a known object, the image confidence level being a ratio of image likelihood of the object of the image model of the known object to the highest image likelihood among image likelihoods the image model of the known object may take; and
calculating an evaluation value by combining the speech confidence level and the image confidence level, comparing the evaluation value with a threshold value, and classifying a target object into an object group determined according to whether the spoken sound of the name and the image are known or unknown.

7. An object recognition method using a classification apparatus including a data storage unit configured to store a spoken sound of a name of an object and an image of the object, the object recognition method comprising:
calculating a speech confidence level of a spoken sound for the name of the object with reference to a speech model of a name of a known object, the speech confidence level being a ratio of speech likelihood of the name of the object for the speech model of the name of the known object to the highest speech likelihood among speech likelihoods calculated in phoneme sequence for the spoken sound of the name of the object;
calculating an image confidence level of an image of an object with reference to an image model of a known object, the image confidence level being a ratio of image likelihood of the object for the image model of the known object to the highest image likelihood among image likelihoods the image model of the known object may take;
calculating an evaluation value by combining the speech confidence level and the image confidence level, comparing the evaluation value with a threshold value, and classifying a target object into an object group determined according to whether the spoken sound of the name and the image are known or unknown; and
recognizing which known object the target object is, the target object being classified into a group of objects whose spoken sound of name and image are known.

* * * * *